2,963,442

DUAL PURPOSE DRY STARCH INDICATOR

Emory T. Erickson, 333 N. Michigan Ave., Chicago 1, Ill.

No Drawing. Filed Feb. 28, 1957, Ser. No. 642,930

4 Claims. (Cl. 252—408)

This invention relates to a new indicator composition and more particularly relates to a starch indicator composition useful in volumetric analyses involving iodine. The use of iodine as a volumetric reagent is well known in the art and may be further classified into two general methods; thus where the method of analysis uses the iodine reagent directly it is known as iodimetric analysis, and where the method of analysis employs iodide based on the reducing properties of the iodide ion, the procedure is indirect and is known as iodometric analysis. Generally the analyses involving iodine-iodide reagents utilize these reagents in carrying out mild oxidation or reduction reactions of specific ions to determine the amount of the particular ion present in an unknown sample. In such iodine determinations it has been the practice to utilize a starch indicator to determine the end point of the titration. The starch indicator is valuable in that a colloidal dispersion of starch in solution which contains both iodine and iodide ions forms a deep blue color with very small concentrations of the iodine-iodide reagent.

It has conventionally been the practice to prepare a liquid starch dispersion which is added in small amounts for indicator purposes to the sample being titrated. These starch dispersions as have been known in the prior art are aqueous dispersions of starch in water and have as one drawback an inherent perishability. More specifically, liquid starch dispersions are subject to bacterial attack on standing. While preservatives have been added to starch solutions to prevent such degradation, a long storage is still not feasible, and further such additives frequently interfere with accurate end points and determinations.

Further in the procedure used in iodometric and iodimetric titrations it is the practice to acidify the sample so that the titration is carried out under controlled acid conditions. These acid conditions are essential for speed of the titration or oxidation reaction and are also useful to repress the hydrolysis of the iodine reagent to iodide and iodate. Accordingly, in the prior art, a sample to be iodimetrically titrated is first acidified by the addition of a small amount of strong acid such as hydrochloric or sulfuric acid. It may be stated that it would be desirable to provide a starch indicator and an acidifying agent in oxidation reduction determinations involving iodine-iodide reagents, which has a prolonged storage life and eliminates the necessity for a separate acidification step.

Accordingly it is an object of the present invention to provide a starch indicator composition that has a prolonged storage life.

A further object is the provision of a starch indicator composition which eliminates the necessity of independent acidification of samples to be analyzed with iodine-iodide reagent.

A still further object is the provision of a starch indicator composition which eliminates the handling of strong liquid mineral acids.

A still further object is the provision of a starch indicator composition by which one may introduce the indicator and acidify the sample in a single step.

These and other objects will be seen in the following specification and claims.

In one form the present invention comprises a starch indicator composition for use in iodometric and iodimetric titrations which comprises a dry pulverulent admixture of a readily dispersible starch and a dry highly ionizable acidic material.

More specifically the present composition relates to a dry pulverulent prepared starch indicator containing a finely divided dispersible starch in intimate admixture with a dry, powdered, highly ionizable, acidic material. The starch contemplated in the preferred form of this invention is a precooked or pregelatinized starch, such as corn starch, which has been spray dried to a powder form subsequent to such precooking operation. This particular starch is especially adapted for use in preparing the present compositions in that it is readily dispersible in cold water without extended cooking or similar techniques. Exemplary of such a pregelatinized readily dispersible starch material is the starch composition sold under the name of Niagara Instant Starch. The dry, pulverulent finely divided, highly ionizable acidic material is selected from the group of compositions which are exemplified by sulfamic acid, hemiphosphates, and the bisulfates. Generally the bisulfates should be water soluble salts exemplary of which are ammonium bisulfate, potassium bisulfate, sodium bisulfate, and the like. Similarly, hemisodium phosphate $NaH_5(PO_4)_2$ is exemplary of the hemiphosphates although other alkali metal salts, such as potassium, may be utilized. It should be stated that sulfamic acid is most preferred since it is relatively nonhygroscopic and is adapted to long storage life. Further, sulfamic acid is especially valuable in that nitrites do not interfere with titrations using the prepared starch indicator employing sulfamic acid. These acidic materials are characterized by the fact that they are normally dry solid materials easily obtainable in a powdered or finely divided form, and upon being dissolved in water, readily ionize to produce a solution of a rather low pH, e.g. 2 to 4. Organic indicators such as methyl orange or methyl yellow are suitable for determining the pH achieved. While the readily dispersible dry starch may be present in the composition in one preferred embodiment in a ratio of about 20 parts by weight of starch to about 80 parts by weight of acidic material, it is also true that the composition may be varied so that it will contain from 15% to 75% of starch, and from 25% to 85% of the acidic material such as sulfamic acid. It should be stated that a 50–50 mixture is well suited for most titrations. The following examples will illustrate specific utilization of the dry starch indicator composition of the present invention.

EXAMPLE 1

*Determination of sulfite ion in boiler water (iodimetric-direct determinations)*

To a 25 milliliter sample of boiler water containing sulfite ion ($SO_3^=$) is added about 0.8 gram of prepared indicator containing a mixture of 80 parts of sulfamic acid and 20 parts of Niagara Instant Starch. Thus sufficient starch indicator is added to provide a pH in the range of 2 to 4. The amount of sulfite is determined by direct addition of a standardized iodine-iodide reagent, usually standardized potassium iodide-iodate, until the end point (appearance of a deep blue color) is reached.

EXAMPLE 2

*Determination of chromate ion in cooling water (iodometric-indirect determinations)*

To a 50 milliliter sample of cooling water containing chromate ion ($CrO_4^=$) is added about 2 grams of a prepared starch indicator composition comprising 20 parts of Niagara Instant Starch and 80 parts of powdered sulfamic acid.

To the sample is added a stoichiometric excess of a previously standardized dilute solution of potassium iodide. The sample is titrated with a standardized solution of sodium thiosulfate until the end point (disappearance of the deep blue color) is reached.

Similarly, a determination of sulfite ion was run in the manner of Example 1 utilizing instead of sulfamic acid-starch indicator about 1.0 gram of a 50%–50% hemisodium phosphate-starch indicator composition. This provided excellent end point determinations.

From the foregoing it is apparent that the prepared starch indicator compositions of the present invention are broadly adaptable to iodine oxidation-reduction volumetric determinations and eliminate the necessity for independently adding a starch indicator and independently acidifying the sample preparatory to titration.

Further, it is readily seen that the composition of the present invention, being in a dry state, is readily adapted for prolonged storage and is easily handled by laboratory personnel, eliminating the necessity for using liquid starch solutions or liquid strong mineral acids. Thus, the present prepared starch indicator compositions are also adapted for use by traveling technical service men or field technicians. It is contemplated that in use the present compositions may be added to samples of the titration by the use of a small scoop which will add the approximate prescribed amount of the composition. Generally in most laboratories, routine analyses permit a rather standardized technique of acidification so that, for example, small scoops containing approximately one-half to two grams of the prepared starch indicator may be utilized to add the necessary amount of starch and acid to insure a rapid and simple titration of the sample. It should be stated that sufficient prepared starch indicator should be added to the sample to provide a distinctly acid media, preferably a media having a pH of about 2 to 4.

It should also be stated that it is not possible, using the prior art liquid starch indicator preparations, to add a mineral acid directly to the starch dispersion since a highly acid media promotes hydrolysis of the starch particles to give products which interfere with the end point. Thus it may be readily seen that in the present compositions it is possible to have an extremely high concentration of acid in the presence of a small amount of starch which will not adversely affect or hydrolyze the starch particles causing decomposition thereof and concomitant interference with accurate end point determinations.

While the foregoing examples have emphasized the use of sulfamic acid, it is also true, as aforesaid, that materials such as ammonium bisulfate, sodium bisulfate, or hemisodium phosphate (also illustrated) are equally useful in that they are dry powdered materials readily admixed with a finely divided, dispersible starch and which, upon hydrolysis obtained by placing the prepared starch indicator in the aqueous solution of the sample, ionize to produce a solution having a pH which will permit rapid and accurate titration.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A starch indicator composition for use in iodimetric-iodometric titrations which comprises a dry pulverulent admixture consisting essentially of up to about 75% of a readily dispersible powdered starch and at least about 25% of a finely divided sulfamic acid.

2. The starch indicator composition of claim 1 wherein the weight ratio of ingredients is from about 25% to about 85% of sulfamic acid and from about 15% to about 75% of starch.

3. The starch indicator composition of claim 1 wherein the weight ratio of ingredients is about 20 parts starch and about 80 parts sulfamic acid.

4. The starch indicator composition of claim 1 wherein the weight ratio of ingredients is about 50 parts starch and about 50 parts sulfamic acid.

References Cited in the file of this patent

UNITED STATES PATENTS

| | | |
|---|---|---|
| 1,105,567 | Kantorowicz | July 28, 1914 |
| 2,317,752 | Fuller | Apr. 27, 1943 |
| 2,475,368 | Bauer et al. | July 5, 1949 |

OTHER REFERENCES

Pierce et al.: Quantitative Analysis, pub'd 1947 by John Wiley & Sons, N.Y., second ed., page 201.

Chemistry and Ind. of Starch-Kerr, pages 455–456, Academic Press, N.Y., 1950.